United States Patent
Tang et al.

(10) Patent No.: US 7,065,369 B2
(45) Date of Patent: Jun. 20, 2006

(54) METHOD OF LOCATING AND MEASURING A MOBILE STATION

(75) Inventors: Jin Tang, Shenzhen (CN); Fangfu Guo, Shenzhen (CN); Weiming Duan, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 126 days.

(21) Appl. No.: 10/898,911

(22) Filed: Jul. 26, 2004

(65) Prior Publication Data

US 2004/0264407 A1 Dec. 30, 2004

Related U.S. Application Data

(63) Continuation of application No. PCT/CN03/00056, filed on Jan. 23, 2003.

(30) Foreign Application Priority Data

Jan. 24, 2002 (CN) ................................ 02 1 10637

(51) Int. Cl.
*H04Q 7/20* (2006.01)
(52) U.S. Cl. ................ 455/456.1; 455/456.2; 455/456.6; 455/422.1; 455/67.11; 455/423; 370/328; 370/338
(58) Field of Classification Search .. 455/456.1–456.6, 455/422.1, 67.11, 67.14, 67.13, 524, 425, 455/423; 370/328–338
See application file for complete search history.

(56) References Cited

U.S. PATENT DOCUMENTS

| 5,644,591 A * | 7/1997 | Sutton ........................ 375/142 |
| 6,236,365 B1 * | 5/2001 | LeBlanc et al. ............ 342/457 |
| 6,307,840 B1 * | 10/2001 | Wheatley et al. ........... 370/252 |
| 6,526,039 B1 * | 2/2003 | Dahlman et al. ........... 370/350 |
| 2002/0107028 A1 * | 8/2002 | Rantalainen et al. ....... 455/456 |
| 2003/0148774 A1 * | 8/2003 | Naghian et al. ............ 455/456 |
| 2004/0248587 A1 * | 12/2004 | Niemenmaa ............. 455/456.1 |

FOREIGN PATENT DOCUMENTS

| WO | WO9815149 A | 4/1998 |
| WO | WO0117125 A | 3/2001 |

* cited by examiner

*Primary Examiner*—Sonny Trinh
*Assistant Examiner*—Khai Nguyen (57) ABSTRACT

The invention discloses a method of locating and measuring a mobile station, which relates with the radio locating technique in mobile communication field. Comparing with the conventional radio locating technique, the method improves the first path determination method of a neighbor base station downlink signal as follows: with geometrical relationship such as the distance between a MS to the reference base station and the distance between a neighbor base station to the reference base station, an effective range of the downlink signal first path of the neighbor base station can be calculated; the effective range is an effective search window that is shorter than the original large search window, and the first path determination of the neighbor base station downlink signal is made within the effective search window. The invention raises the first path determination accuracy of a neighbor base station downlink signal, so the mobile station locating accuracy is raised too.

7 Claims, 6 Drawing Sheets

METHOD OF LOCATING AND MEASURING A MOBILE STATION

CROSS-REFERENCE TO RELATED APPLICATIONS

This application is a continuation of International Application No. PCT/CN03/00056 filed on Jan. 23, 2003. This application claims the benefit of Chinese Patent Application No. CN 02110637.1 filed Jan. 24, 2002. The disclosures of the above applications are incorporated herein by reference.

FIELD OF THE INVENTION

The present invention relates generally to radiolocation technology, and more particularly to a method of location and measuring a mobile station (MS) in the mobile communication field.

BACKGROUND OF THE INVENTION

In the MS radio locating area, usually two locating methods are used: the Time Of Arrival (TOA) method and the Time Difference Of Arrival (TDOA) method. For locating a MS, the TOA method needs three or more than three TOA values, and the TDOA method needs two or more than two TDOA values. In general, a TOA value or TDOA value is obtained by measuring arrival time or arrival time difference of downlink signals from different base stations to the MS. No matter the measurement is an arrival time or an arrival time difference of downlink signals, how a MS captures and detects effectively the first path of downlink signals from different base stations should be concerned.

In W-CDMA, a MS locating with TDOA needs to measure the arrival time difference of downlink signals from different base stations, i.e. making OTDOA (Observed TDOA) measurement in 3GPP. The basic procedure of OTDOA is as follows: the Mobile Location Center initiates to the MS a OTDOA measurement request for designated reference base station; after the MS has received the measurement request, the MS detects the first path of the downlink signal of the reference base station and at the same detects the downlink signal of other neighbor base stations. The MS sets appropriate search window according to the search window parameters in the measurement request to detect the downlink signals of the neighbor base stations. The general search window setting method for the neighbor base stations is as follows: take the location that corresponds the first path of the detected reference base station downlink signal as the center of the search window, take double distances, which can be represented as a propagation time, between a neighbor base station and the reference base station as the search window width; for every neighbor base station, set the search window in the same way, capture and detect the first path of downlink signals, and then subtract or make correlation operation with the downlink signal first path of the reference base station to obtain appropriate time-delay estimated TDOA value.

Advantages of the method mentioned above are that it is simple to set search window and can capture the neighbor signals completely. The disadvantages are as follows: since its search window is wider, so determination of the first path in the search window is more difficult; and the determination correctness is lower which is that: at conditioning of the same noise threshold, with a wider search window, the false alarm probability is higher, i.e. the probability of seeing a noise as a first path is higher. Besides, in a locating measurement it is more concerned about the accuracy of first path location but not about whether the captured multipath signals are completed; this is totally different with the aim of multipath searching with a Rake receiver. When the first path signal cannot be detected because of small size fading and the time-delay between the second path signal and the first path signal is larger, the conventional first path signal measurement method will take the second path as the first path, in this case there is a larger measurement error that is meaningless for location estimation. Therefore, the conventional first path detection method has the disadvantages of a larger false alarm probability and a large error of the first path detection that will decrease MS locating accuracy.

SUMMARY OF THE INVENTION

From the above analysis, it can be seen that the objective of the invention is to improve the conventional first path determination method in order to raise the first path determination accuracy of the downlink signal of a neighbor base station and further to raise the whole locating accuracy.

The improvement is that with geometrical relationship such as the distance between a MS to the reference base station and the distance between a neighbor base station to the reference base station, an effective range of the downlink signal first path of the neighbor base station can be calculated; the effective range is an effective search window that is shorter than the original search window. The effective search window is obtained on the base of subdivision of the original search window, the first path determination of the neighbor base station downlink signal is made within the effective search window. The new determination method uses the correlation data of the large search window and the effective search window to determine the first path of the neighbor base station downlink signal, so a first path measurement accuracy of a neighbor base station downlink signal is raised, therefore a MS locating accuracy is raised too.

The technical scheme of the invention is as follows: set a large search window and a effective search window reasonably based on information concerning about a reference base station, neighbor base stations and a MS; detect the first path of downlink signals of the reference base station and the neighbor base stations through the large search window and the effective search window. First path detective method of a downlink signal of a neighbor base station is as follows: calculate noise average power using the correlation data of the large search window, determine and obtain the first path of the downlink signal of said neighbor base station using said noise average power and said the correlation data of the effective search window, make correlation computation of the first path of the downlink signal of said reference base station and the first path of the downlink signal of said neighbor base station or subtract directly these two first path to obtain the TDOA, locating said MS with said TDOA. In general, an effective search window is within a large search window. Said information concerning about a reference base station, neighbor base stations and a MS includes a distance between a MS and a reference base station, and a distance between a neighbor base station and a reference base station. Specifically, the method of the invention comprises the following steps:

a. A Mobile Location Center selects a reference base station and neighbor base stations according to received signal quality;

b. Said Mobile Location Center calculates a large search window starting location $T_{start}$ and stop location $T_{stop}$ and an effective search window starting location $t_{start}$ and stop location $t_{stop}$ and initiates an appropriate measurement request to said MS;

c. Said MS sets a large search window parameters and an effective search window parameters of said neighbor base stations according to said measured parameters and said large search window and effective search window parameters;

d. Said MS determines first path of said neighbor base stations using said large search window and said effective search window;

e. Said MS outputs first path determination result of said neighbor base stations;

f. Make correlation operation with first path of said neighbor base station downlink signal and first path of said reference base station downlink signal, and obtain TDOA;

g. Define said MS location according to two or more than two TDOA.

In Step b, said large search window starting location $T_{start}$ and stop location $T_{stop}$ and said effective search window starting location $t_{start}$ and stop location $t_{stop}$ are calculated with the following steps:

b1. According to the Relative Time Difference (RTD) of said reference base station downlink signal and said neighbor base station downlink signal, and a propagation time D that corresponds to a distance between said two base stations, $T_{start}$ and $T_{stop}$ are calculated with following formulas:

$$T_{start} = RTD - D$$

$$T_{stop} = RTD + D$$

b2. According to the measured RTT (Round Trip Time), which is a signal Round Trip Time between said reference base station and said MS, and the measured UE_Rx_Tx, which is time difference of transmitting time and receiving time in MS, calculate a signal Single Trip Time (STT) with following formula:

$$STT = \frac{RTT - UE\_Rx\_Tx}{2};$$

b3. According to sector coverage area of said reference base station, distance between said neighbor base station and reference base station, said STT and geometrical principle, calculate effective reach range of said neighbor base stations $D_{min}$ and $D_{max}$;

b4. Set a protective width $t_{protect}$ for said effective search window;

b5. According to STT, RTD, $D_{min}$, $D_{max}$ and $t_{protect}$, calculate said effective search window starting location $t_{start}$ and stop location $t_{stop}$, with following formulas:

$$t_{start} = RTD + D_{min} - STT - t_{protect};$$

$$t_{stop} = RTD + D_{max} - STT + t_{protect}$$

b6. Output said large search window parameters $T_{stop}$ and $T_{stop}$, said effective search window parameters $t_{start}$ and $t_{stop}$.

In Step d, first path determination of said neighbor base station downlink signal takes the following steps:

d1. Said MS makes multipath searching in said large search window, and defines candidate paths in said effective search window;

d2. Said MS gets rid of said candidate paths in said effective search window and calculates noise average power in said large search window;

d3. Said MS defines single path SNR threshold, according to said effective search window width;

d4. According to said noise average power of said large search window calculated in Step d2, and said single path SNR threshold defined in Step d3, make multipath determination of said neighbor base station downlink signal to select a first path of said neighbor base station downlink signal.

Step d4 further includes:

d41. Define a noise power threshold that satisfied an expected false alarm probability according to said. noise average power calculated in Step d2 and single path SNR threshold defined in Step d3;

d42. Determine candidate paths whose power are larger than said noise power threshold in said effective search window as effective paths, and select an earliest effective path between them as an effective first path of said neighbor base station downlink signal.

Step d also further includes: get rid of effective paths according to said multipath determination result, repeat Steps d2 to d4 to make again multipath determination of said neighbor base station downlink signal in said effective search window, and select final effective first path.

Comparing with the conventional method, the invention proposes the method that has an effective search window, so the false alarm probability of first path detection of the neighbor base station downlink signal is decreased; said false alarm probability is the probability of mistaken taking a noise as an effective path. In this way, the method can get rid of the first path measurement with larger error and raises the first path determination accuracy of a neighbor base station downlink signal. Furthermore, the method makes noise statistic with a large search window and uses an effective search window width to calculate the SNR threshold, so a noise statistic without enough accuracy caused by a shorter effective search window width is avoided, the setting of a noise power threshold is more reasonable, and the first path determination accuracy is raised. In some cases, for example, an effective search window is large enough and hardware resources of a MS multipath searcher is limited, using effective search window parameters to set a large search window can save some hardware resources of a multipath searcher.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail with reference to drawings and embodiments.

Figure 1:
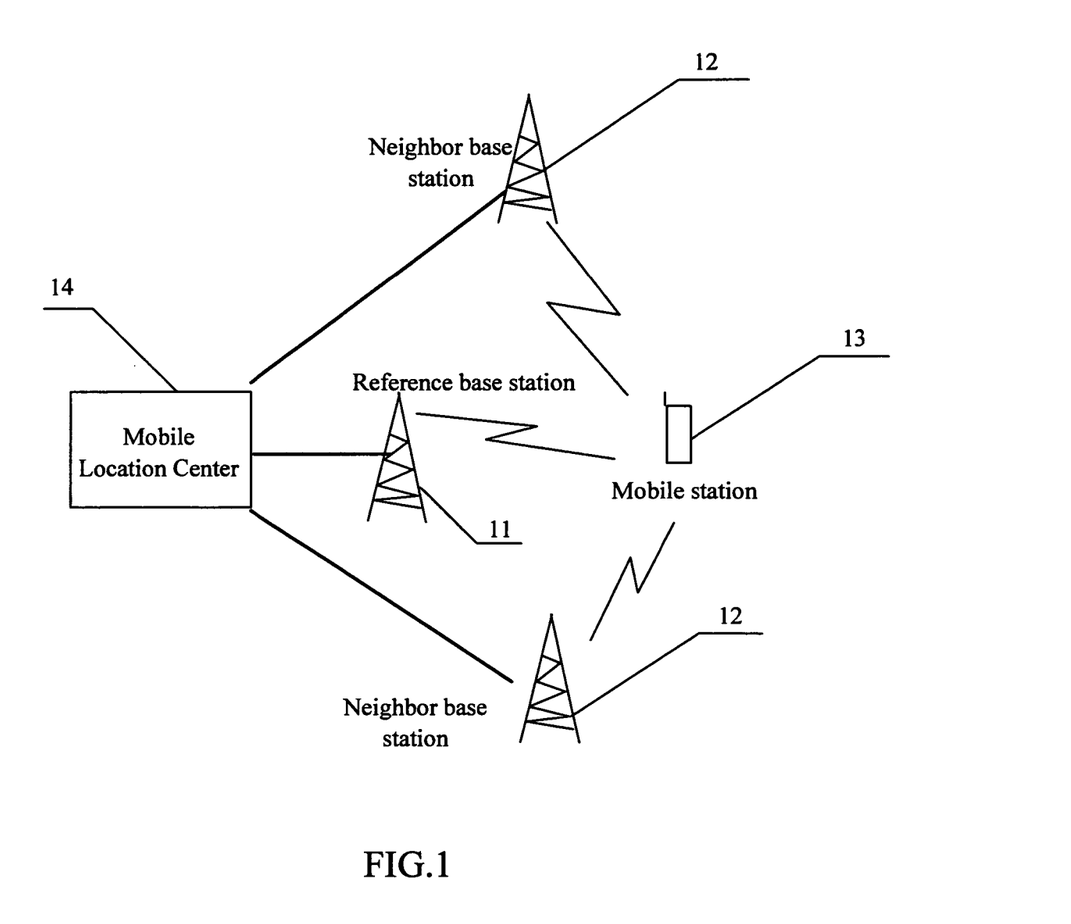
FIG. 1 shows a structure diagram of locating and measuring a MS.

FIG. 1 shows a structure diagram of locating and measuring a MS; the diagram shows relationship among a reference base station 11, neighbor base stations 12, a MS 13 and a Mobile Location Center 14.

Figure 2:
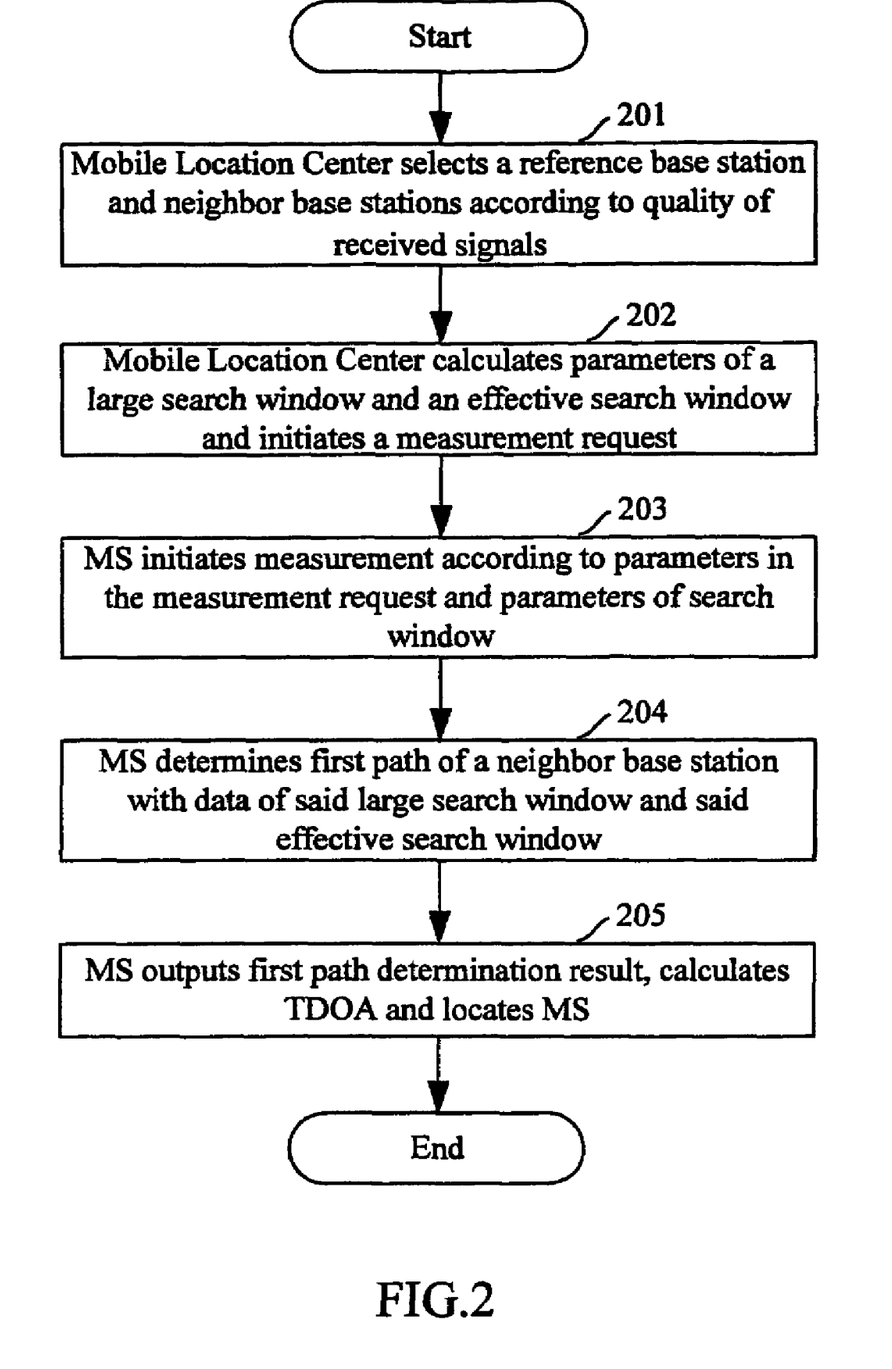
FIG. 2 shows the general flowchart of locating and measuring a MS of the invention.

FIG. 2 shows the general flowchart of the invention; it includes the following steps:

Step 201. The Mobile Location Center 14 selects a base station that is connected with the MS 13 as the reference base station 11; at the same time it designates several base stations as the neighbor base stations 12. The reference base station 11 is selected from the one that has a better communication quality in the active set of the MS 13 (candidate set of the base stations that connects with the MS 13); and the neighbor base stations 12 are selected from the other members of the MS 13 active set and the MS 13 monitor set.

Step 202. Based on some auxiliary information, the Mobile Location Center 14 calculates the large search window and the effective search window parameters of the neighbor base stations 12; and then with other measuring parameters, the Mobile Location Center 14 initiates an appropriate measurement request of the downlink signals of different base stations to the MS 13.

For said search window parameters, the Mobile Location Center provides the appropriate parameters of large search window and the effective search window of every neighbor base station 12, wherein, the said search window parameters are all concerned about neighbor base stations 12□ and the search window of the reference base station 11 takes the conventional first path searching parameters.

Figure 7:
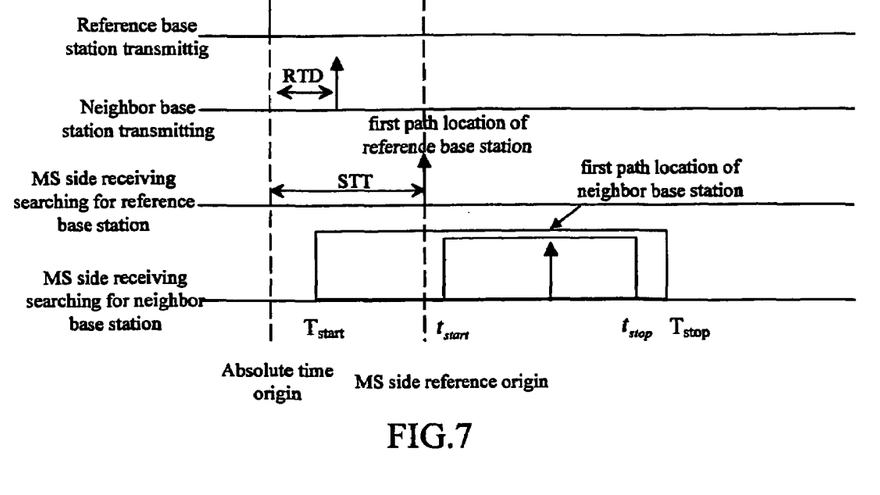
FIG. 7 shows a diagram to set search windows with parameters concerned.

Step 203. Having received the measurement request from the Mobile Location Center 14, the MS 13 makes first path detection for the reference base station 11 with the conventional method; and then taking the first path location of the reference base station 11 as the origin, define the large search window according to starting location and stop location $T_{start}$ and $T_{stop}$, and define the effective search window of the first path of the neighbor base stations 12 according to the starting location and stop location $t_{start}$ and $t_{stop}$. FIG. 7 shows a diagram that the MS 13 defines the search windows according to the parameters: $T_{start}$, $T_{stop}$, $t_{start}$, $t_{stop}$, RTD, STT. Suppose the large search window width and the effective search window width are $W_{whole}$ and $W_{valid}$, respectively, taking chip as the unit, then $$W_{whole} = T_{stop} - T_{start}$$

$$W_{valid} = t_{stop} - t_{start}$$

When the effective search window width is large enough, such as larger than 40 chips, and because the multipath searcher hardware resource of the MS 13 is limited, in order to decrease the computation volume of the MS 13 and to keep accuracy of the first path determination, the large search window and the effective search window takes the same parameters, that is:

$$W_{whole} = W_{valid} = t_{stop} - t_{start}$$

Step 204. The MS 13 makes noise statistic of downlink signals of the neighbor base stations 12 using data of the large search window, and makes the first path determination of downlink signals of the neighbor base stations 12 using data of the effective search window.

Step 205. The MS 13 outputs first path determinations of downlink signals of different base stations. According to the first path of the reference base station 11 signal and the first path determination of more than two different neighbor base stations 12 signal, the estimated TDOA values of appropriate time delay difference are constructed; the Mobile Location Center 14 can effectively estimate the geographical location of MS 13 according to more than two said estimated TDOA values, so the MS 13 is located.

Figure 3:
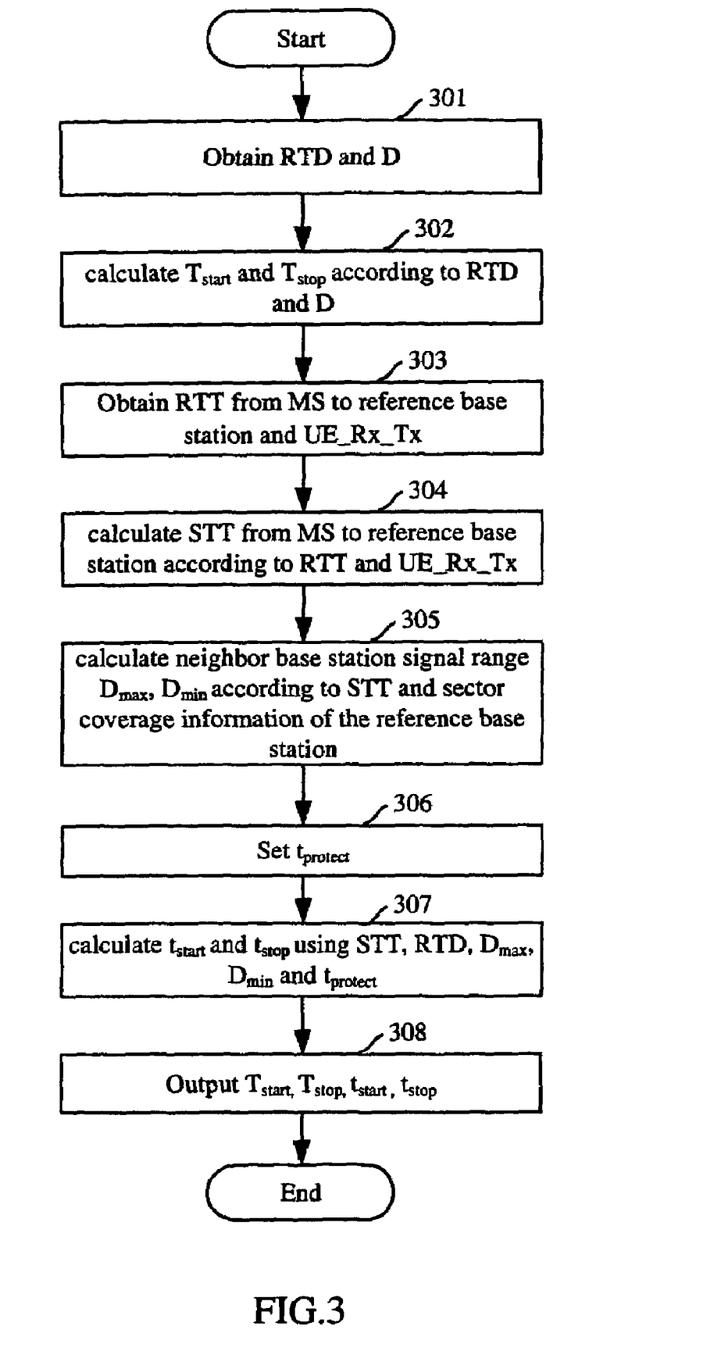
FIG. 3 shows the flowchart to define starting location and stop location of a large search window and an effective search window.

FIG. 3 shows the specific computation steps of the starting location $T_{start}$ and stop location $T_{stop}$ of the large search window and the starting location $t_{start}$ and stop location $t_{stop}$ of the effective search window, which are used in above Step 202.

Step 301. The large search window parameters are obtained as follows, which are same as conventional method: take the first path location of the reference base station 11 downlink signal as reference center, and the arrival time of the neighbor base stations 12 signal is within the range [RTD−D , RTD+D], wherein the D is the distance d between the reference base station 11 and the neighbor base stations 12 but taking a chip as the unit, and the RTD, taking a chip as its unit, represents the transmitting time difference of downlink signals between the reference base station 11 and the neighbor base station 12, because they are not synchronized.

Chip mentioned above is a time unit. In WCDMA, a chip=1/3.84e6s; the distance between the reference base station 11 and the neighbor base station 12 corresponds with the propagation time of the signals one by one, and the radio signal propagation velocity is the velocity of light, so taking the distance divided by the velocity of light is the corresponding propagation time.

Step 302. The parameters of the large search window are obtained as follows: take the first path of the reference base station 11 which is detected by the MS 13 as the origin location, the starting location $T_{start}$ and the stop location $T_{stop}$ take the values:

$$T_{start} = RTD - D$$

$$T_{stop} = RTD + D$$

The starting location and the stop location of the effective search window are obtained as follows:

Having known an approximate distance of the MS 13 to the reference base station 11, i.e. the approximate propagation time, based on the basic geometrical relationship, it can be deduced that a time range that downlink signals of the neighbor base stations 12 reach the MS 13 is less than the range of the said large search window, and the new time range is the effective search window.

The geometrical principle of defining the effective search window will be described with reference to FIG. 5 and FIG.

6. Suppose the distance from the MS 13 to the neighbor base station 12 is r2 whose effective range is [dmin, dmax].

Figure 5:
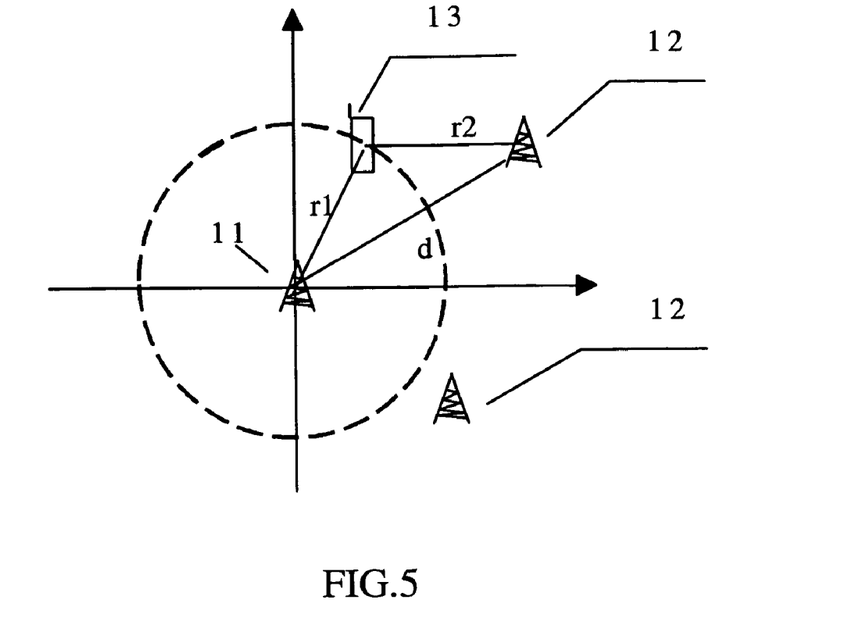
FIG. 5 shows a geometrical principle diagram to define an effective range of a neighbor base station signal when the reference base station is an omni-directional cell.
Figure 6:
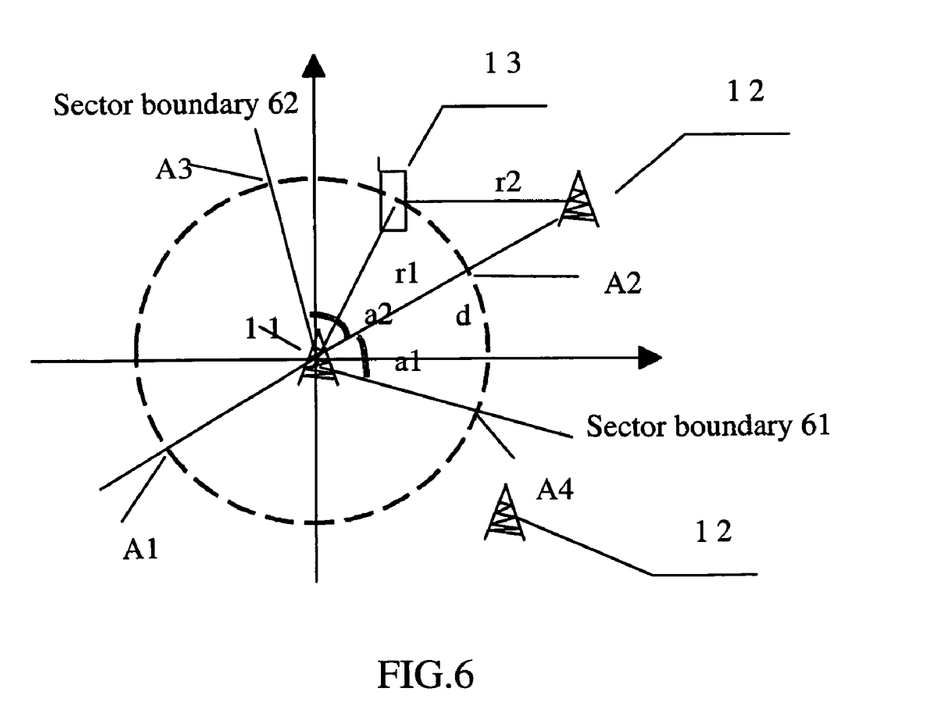
FIG. 6 shows a geometrical principle diagram to define an effective range of a neighbor base station signal when the reference base station is comprised of multiple sectors.

FIG. 5 shows the case that the reference base station 11 is an omni-directional cell. Suppose the distance of the MS 13 to the reference base station 11 is r1, and the distance between the reference base station 11 and the neighbor base station 12 is d; in this case, the distance between the neighbor base station 12 and the MS 13 must be within [|d−r1|, d+r1], this is because of the geometrical principle that one side length of a triangle is less than the sum of other two side lengths, and one side length is greater than the subtract of other two side lengths.

FIG. 6 shows the case that the reference base station 11 is a multiple sectors base station. Suppose that: the distance between the MS 13 and the reference base station 11 is r1, the distance between the reference base station 11 and a neighbor base station 12 is d, the angles between the two sector boundaries 61 and 62 of the reference base station 11 and the line from the reference base station 11 to the neighbor base stations 12 are a1 and a2, respectively; in this case, the range of r2 that is the distance between the MS 13 and the neighbor base station 12 will be defined with the following method:

First, define the coordinates of points A1 and A2 that are the intersections of the circle with radius r1 and the line from the reference base station 11 to the neighbor base stations 12, and the coordinates of points A3 and A4 that are the intersections of the sector boundaries 61, 62 and the circle with radius r1.

Then, calculate distance d3 and distance d4 from the neighbor base station 12 to the A3 and A4, respectively, with the following formulas:

$$d3 = \sqrt{d^2 + r1^2 - 2d \cdot r1 \cdot \cos(a1)}$$
$$d4 = \sqrt{d^2 + r1^2 - 2d \cdot r1 \cdot \cos(a2)}$$

Secondly, based on whether the A1 and A2 are in the cell coverage area to define the range [dmin,dmax] of r2 as follows; wherein r2 is the distance between the neighbor base station 12 and the MS 13:

If A1 and A2 are all in the cell coverage area, the range of r2 is [|d−r1|, d+r1];

If A1 is in the cell coverage area, but A2 is out of the cell coverage area, then the range of r2 is [min (d3, d4 ), d+r1];

If A2 is in the cell coverage area, but A1 is out of the cell coverage area, then the range of r2 is [|d−r1|, max ( d3, d4 )];

If A1 and A2 are all out of the cell coverage area, the range of r2 is [min ( d3, d4 ), max ( d3, d4 )].

The method to define the effective search window range can be obtained from the geometrical principle mentioned above. Auxiliary information to define the range of the effective search window includes r1, which is the distance between the reference base station 11 and the MS 13, and basic configure information of the locating center; the later is easier to obtain, so the key point is how to obtain the r1.

Step 303. Obtain the measured RTT (Round Trip Time) and the time difference of transmitting time and receiving time UE_Rx_Tx of the MS 13; in a W-CDMA, a base station that is connected with the MS 13 can provide the corresponding measured value of RTT.

Step 304. Through the measured value of RTT, the STT (Single Trip Time) of the propagation time of a signal from the reference base station 11 to the MS 13 can be calculated with the following formula, wherein the STT is corresponding with the distance from reference base station 11 to the MS 13:

$$STT = \frac{RTT - UE\_Rx\_Tx}{2}$$

Wherein the UE_Rx_Tx represents time difference of the receiving-transmitting time that is the time difference between the MS 13 receiving a signal from the reference base station 11 and transmitting an appropriate uplink signal.

Step 305. After getting the STT that corresponds to r1, the absolute distance range [dmin, dmax] of the effective search window and the corresponding time range $[D_{max}, D_{min}]$ can be defined, wherein the time range $[D_{max}, D_{min}]$ is absolute time.

Step 306. Set the protective width of the effective search window to $t_{protect}$.

Step 307. Calculate the starting location of the effective search window $t_{start}$ and the stop location of the effective search window $t_{stop}$ by STT, RTD, $D_{max}$, $D_{min}$ and $t_{protect}$, and the first path location of the reference base station 11 that is detected by the MS 13 is taken as the center origin of the effective search window. When calculating the effective search window parameters, it is necessary to have some margin, since the transmission of the neighbor base stations 12 and the reference base station 11 is not synchronized and there is some error between STT and the real distance etc. Therefore, the final starting location and stop location of the effective search window is calculated with the two formulas, respectively:

$$t_{start} = RTD + D_{min} - STT - t_{protect}$$

$$t_{stop} = RTD + D_{max} - STT + t_{protect}$$

Wherein the $[D_{min}, D_{max}]$ is the time range of the effective search window taking a chip as its unit, and they comes from the distance range [dmin, dmax]; the $t_{protect}$ represents the error protective width of the effective search window, in general it is 1 to 2 chips.

Step 308. The parameters of the starting location and the stop location of the large search window and the effective search window are outputted; they are $T_{start}$, $T_{stop}$ and $t_{start}$, $t_{stop}$, respectively, and the reference origin location of the large search window and the effective search window takes the first path location of the downlink signal of the reference base station 11. Usually, STT<D, so the effective search window must within the large search window; only when STT>D and the reference base station 11 is an omni-directional cell ($t_{protect}$=0), the effective search window width equals to the large search window width.

Figure 4:
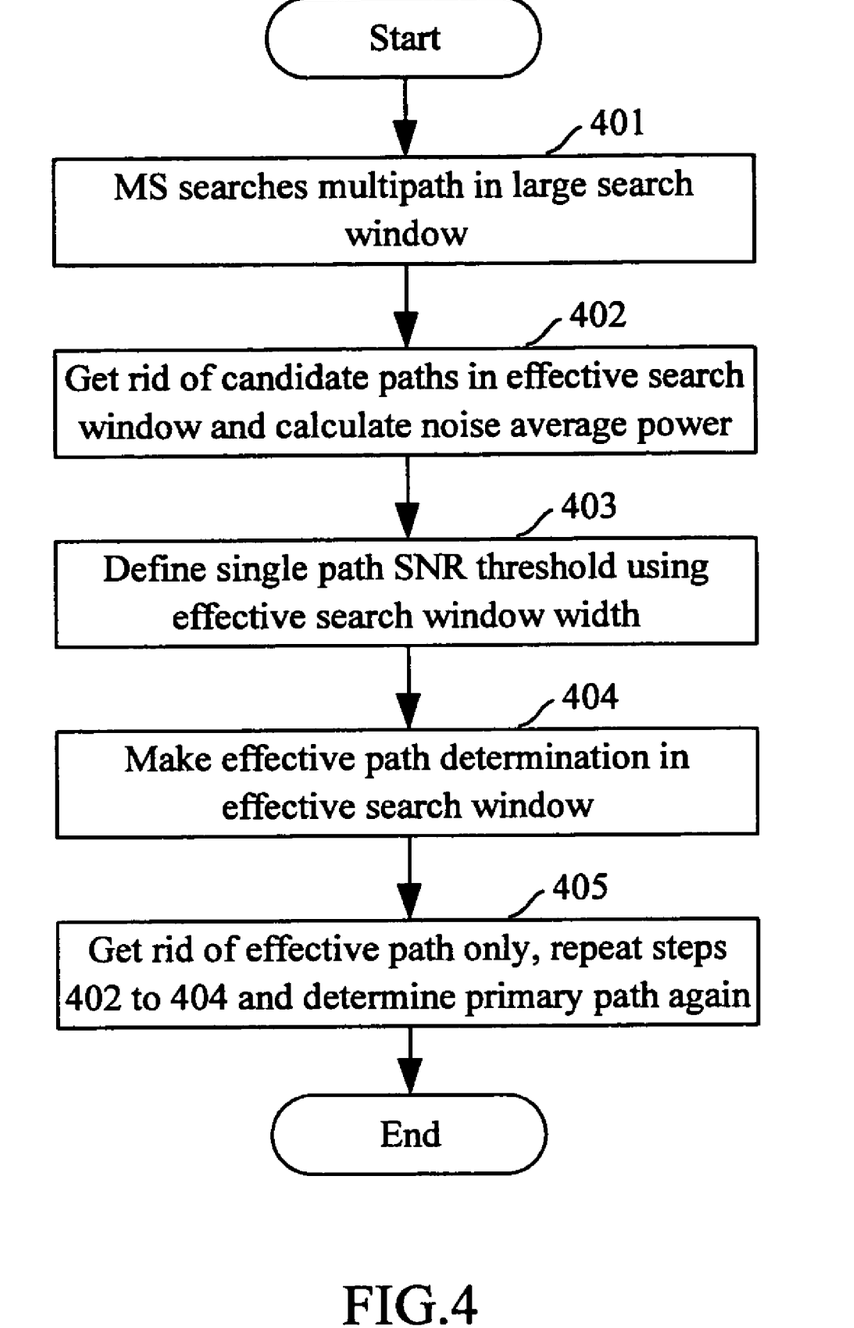
FIG. 4 shows the flowchart of first path determination of a neighbor base station downlink signal.

As shown in FIG. 4, the first path determination of the downlink signal of the neighbor base stations 12 in Step 204 takes the following steps:

Step 401. The MS 13 makes multipath searching within the large search window, i.e. the MS 13 searches the downlink signal of the neighbor base stations 12 within the large search window, to obtain the power delay profile.

Step 402. Get rid of the candidate paths within the effective search window, and calculate noise average power of the large search window; i.e. take several most powerful peak sample points of the power within the effective search window as the candidate paths and get rid of the candidate path power and power of certain sample points that are at the left and right sides of the candidate path from the total power of the large search window; for example, suppose each chip has Ns sample points, get rid of Ns−1 sample points and the remaining power is the noise power; and then calculate the average power $P_{av}$ of noise, in general, number of candidate paths is 3 to 10.

Step 403. Define the single path SNR threshold according to the effective search window width; purpose of this step is to decrease mistaken determination probability of taking noise as a first path through setting a reasonable noise threshold, i.e. to decrease false alarm probability. The basic principle is as follows: suppose the expected false alarm probability is p, and probability that each noise sample point is less than the noise level threshold is α; then taking the effective search window width $W_{valid}$ and the formula $1-\alpha^{Ns \cdot Wvalid}=p$, the α is calculated, for example, take p=1%, $W_{valid}=10$, Ns=4, then α=99.975% has been calculated. According to the probability cumulative distribution chart of the statistical noise power distribution, i.e. having normalized the noise average power to obtain the cumulative distribution chart, a power ratio (dB) corresponding to the α is found and the power ratio is the single path SNR threshold $SNR_{th}$ that satisfies the expected false alarm probability.

Step 404. Based on the noise average power of the large search window and the single path SNR threshold, the multipath determination procedure in the effective search window is as follows:

According to the noise average power $P_{av}$ calculated in the step 402 and the single path SNR threshold $SNR_{th}$ calculated in the step 403, the noise threshold power that satisfies the expected false alarm probability is $P_{th}=P_{av}*SNR_{th}$; in the effective search window, it is determined that the candidate paths with power greater than the noise threshold power $P_{th}$ are effective paths, and select the earliest effective path as the effective first path of the neighbor base station 12 downlink signals.

Step 405. Get rid of the effective paths in the power delay profile, and make the multipath determination again; the procedure is as follows:

Get rid of the effective paths (it is possible that the effective paths are more than one) in the power delay profile; keeping the SNR threshold unchanged, calculate the noise average power of the large search window and the noise threshold power; repeat steps 402, 403 and 404, perform the multipath determination procedure in the effective search window newly, select effective first path finally.

Purpose of Step 405 is to raise accuracy of the first path detection. When the width of the large search window is larger, with or without several sample points does not affect the statistical noise average power so much, so the Step 405 may be neglected.

Figure 8:
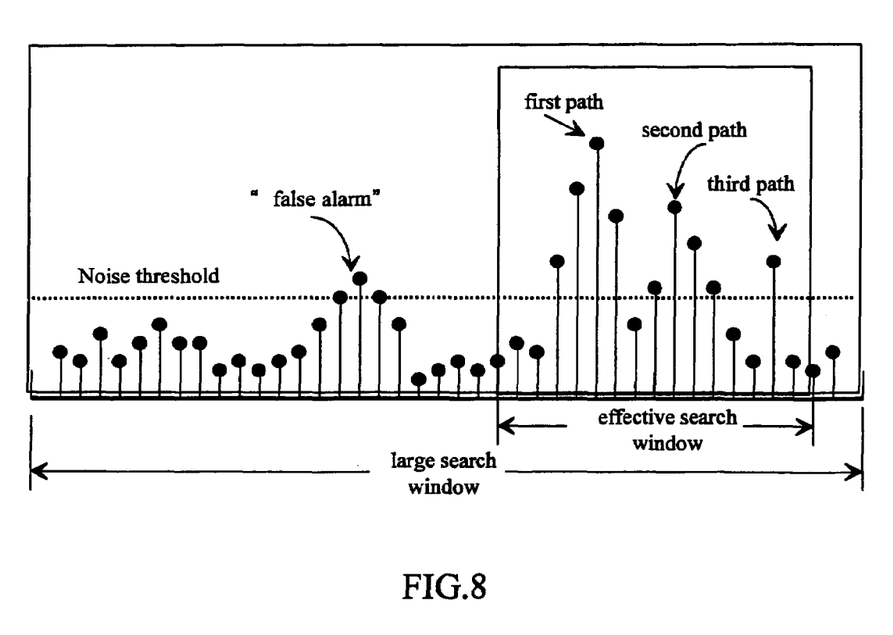
FIG. 8 shows a first path determination diagram using a large search window and an effective search window synthetically.

FIG. 8 shows a diagram for the first path determination of a neighbor base stations 12, using a large search window and an effective search window. In this diagram, the dot-line is the noise threshold, and the paths that are within the large search window, out of the effective search window and above the threshold are the 'false alarm' and are got rid of; search every path in the effective search window to obtain the first path of the downlink signal of a neighbor base stations 12.

All the mentions above are only embodiments, and it is by no means to limit the protection scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of locating and measuring a mobile station (MS), comprising:
   a. selecting a reference base station and neighbor base stations according to quality of received signals by a Mobile Location Center;
   b. calculating parameters of a large search window and a effective search window: a large search window starting location $T_{start}$ and stop location $T_{stop}$ and an effective search window starting location $t_{start}$ and stop location $t_{stop}$, according to information concerned about the reference base station, neighbor base stations and the MS by the Mobile Location Center, and initiating a measurement request to the MS;
   c. setting a large search window and an effective search window for the neighbor base stations according to measured parameters and the parameters of a large search window and a effective search window by the MS;
   d. determining first path of the neighbor base stations with the large search window and the effective search window by the MS;
   e. outputting first path determination result of the neighbor base station downlink signal by the MS;
   f. making correlation operation with first path of the neighbor base station downlink signal and first path of the reference base station downlink signal, and obtaining Time Difference Of Arrival (TDOA);
   g. locating the MS according to two or more than two TDOAs obtained in Step f.

2. The method according to claim 1, wherein the effective search window is within the large search window.

3. The method according to claim 1, wherein the information concerned about the reference base station, neighbor base stations and MS includes a distance between the reference base station and the MS, a distance between the neighbor base station and the reference base station.

4. The method according to claim 1, wherein in the Step b, said calculating parameters of a large search window and a effective search window comprising:
   b1. calculating $T_{start}$ and $T_{stop}$ according to a transmitting Relative Time Difference (RTD) of the reference base station downlink signal and the neighbor base station downlink signal, and a propagation time D corresponding to a distance between the reference base station and the neighbor base station with following formulas:

$$T_{start}=RTD-D$$

$$T_{stop}=RTD+D$$

b2. calculating a signal Single Trip Time (STT) from the MS to the reference base station according to measured RTT, being a signal Round Trip Time between the reference base station and the MS, and measured UE_Rx_Tx, being a time difference of transmitting time and receiving time of the MS, with following formula:

$$STT = \frac{RTT - UE\_Rx\_Tx}{2};$$

b3. calculating effective reach range $D_{min}$ and $D_{max}$ of the neighbor base station signal according to sector coverage area of the reference base station, a distance between the neighbor base station and the reference base station, the STT and relational geometrical principle;

b4. setting a protective width $t_{protect}$ for the effective search window;

b5. calculating the effective search window starting location $t_{start}$ and stop location $t_{stop}$ according to STT, RTD, $D_{min}$, $D_{max}$ and $t_{protect}$ with following formulas:

$t_{start} = RTD + D_{min} - STT - t_{protect}$ $t_{stop} = RTD + D_{max} - STT + t_{protect}$;

b6. outputting the parameters of the large search window: $T_{start}$ and $T_{stop}$, and the parameters of the effective search window: $t_{start}$ and $t_{stop}$.

5. The method according to claim 1, wherein the Step d comprising:

d1. making multipath searching in the large search window by the MS, and defining candidate paths in the effective search window;

d2. getting rid of the candidate paths in the effective search window by the MS, and calculating noise average power in the large search window;

d3. defining single path SNR threshold according to said effective search window width by the MS;

d4. making multipath determination of the neighbor base station downlink signal in the effective search window to select a first path of the neighbor base station downlink signal, according to the noise average power of the large search window calculated in Step d2 and the single path SNR threshold defined in Step d3.

6. The method according to claim 5, wherein the Step d4 comprising:

determining a noise power threshold that satisfied an expected false alarm probability according to the noise average power calculated in Step d2 and single path SNR threshold defined in Step d3;

defining candidate paths whose power being larger than the noise power threshold in the effective search window as effective paths, and selecting the earliest effective path among all the effective paths as the effective first path of the neighbor base station downlink signal.

7. The method according to claim 5, the Step d further comprising:

getting rid of effective paths according to the multipath determination result of Step d4, repeating Steps d2 to d4 to make again multipath determination of the neighbor base station downlink signal in the effective search window, and selecting the final effective first path.

* * * * *